US012162623B2

United States Patent
Quatmann et al.

(10) Patent No.: US 12,162,623 B2
(45) Date of Patent: Dec. 10, 2024

(54) METHODS AND SYSTEMS FOR CONTROLLED DISEMBARKATION OF AIRCRAFT PASSENGERS

(71) Applicants: Airbus Operations GmbH, Hamburg (DE); Airbus SAS, Blagnac (FR)

(72) Inventors: Frank Quatmann, Hamburg (DE); David Wottke, Hamburg (DE); Claire Coleman, Blagnac (FR)

(73) Assignees: Airbus Operations GmbH, Hamburg (DE); Airbus SAS, Blagnac (FR)

( * ) Notice: Subject to any disclaimer, the term of this patent is extended or adjusted under 35 U.S.C. 154(b) by 136 days.

(21) Appl. No.: 17/972,624

(22) Filed: Oct. 25, 2022

(65) Prior Publication Data

US 2023/0125443 A1  Apr. 27, 2023

(30) Foreign Application Priority Data

Oct. 27, 2021  (EP) ..................... 21205079

(51) Int. Cl.
  *G08B 5/00*    (2006.01)
  *B64D 11/06*   (2006.01)
  (Continued)

(52) U.S. Cl.
  CPC ............. *B64D 45/00* (2013.01); *B64D 11/06* (2013.01); *G08B 7/066* (2013.01); *B64D 2045/007* (2013.01)

(58) Field of Classification Search
  CPC .. B64D 45/00; B64D 11/06; B64D 2045/007; B64D 45/0051; B64D 45/0056; G08B 7/066; B64F 1/30
  (Continued)

(56) References Cited

U.S. PATENT DOCUMENTS

2014/0253335 A1*  9/2014  Curtis ..................... G08B 5/00
                                                              340/573.1
2015/0120565 A1*  4/2015  Nakajima ............... H04W 4/70
                                                                  705/50
(Continued)

FOREIGN PATENT DOCUMENTS

EP    3566947 A1    11/2019
EP    3566948 A1    11/2019

OTHER PUBLICATIONS

European Search Report dated Mar. 23, 2022; priority document.
(Continued)

*Primary Examiner* — Anh V La
(74) *Attorney, Agent, or Firm* — Greer, Burns & Crain, Ltd.

(57) ABSTRACT

A passenger aircraft includes a plurality of passenger seats arranged in seat rows, and a disembarkation guidance system. The disembarkation guidance system includes a plurality of electronically operable visual indicators, each of the plurality of electronically operable visual indicators being assigned to a respective seat row. The disembarkation guidance system further includes an indicator control device coupled to each of the electronically operable visual indicators. The indicator control device is configured to individually control electronically operable visual indicators to indicate passengers in the assigned seat row whether they are permitted to disembark the passenger aircraft.

14 Claims, 1 Drawing Sheet

(51) Int. Cl.
B64D 45/00 (2006.01)
G08B 7/06 (2006.01)

(58) Field of Classification Search
USPC ... 340/815.4, 815.49, 815.5, 815.45, 815.53, 340/815.56, 947, 971
See application file for complete search history.

(56) References Cited

U.S. PATENT DOCUMENTS

| | | | |
|---|---|---|---|
| 2018/0265203 A1* | 9/2018 | Agrawal | B64D 11/0696 |
| 2019/0344891 A1 | 11/2019 | Hakla et al. | |
| 2019/0344892 A1 | 11/2019 | Pozzi et al. | |
| 2022/0242588 A1* | 8/2022 | Watson | G08G 5/0021 |

OTHER PUBLICATIONS

M. Schultz et al., "Optimized Aircraft Disembarkation Considering COVID-19 Regulations" Transportmetrica B: Transport Dynamics, Aug. 16, 2021, pp. 1-21.

* cited by examiner

METHODS AND SYSTEMS FOR CONTROLLED DISEMBARKATION OF AIRCRAFT PASSENGERS

CROSS-REFERENCES TO RELATED APPLICATIONS

This application claims the benefit of the European patent application No. 21205079.3 filed on Oct. 27, 2021, the entire disclosures of which are incorporated herein by way of reference.

FIELD OF THE INVENTION

The present invention pertains to methods, systems and devices for controlled disembarkation ("deplaning") of passenger on board of an aircraft.

Although applicable for any kind of vehicle, the present invention and the corresponding underlying problems will be explained in further detail in conjunction with an aircraft.

BACKGROUND OF THE INVENTION

Upon arrival of an aircraft at its destination, passengers need to get up from their seats, collect their belongings and leave the aircraft. Due to the bottleneck created by aisles and doors, inadvertent simultaneous action of the passengers upon a simultaneous ready sign such as the clearance of the flight caption will inevitably result in jams and unnecessary delays.

In some approaches for a more controlled deplaning, batches of passenger groups are formed for sequential disembarkation processes. For example, aggregated rows of seats or seats in the same column are grouped up in such batches. All groups of a batch are permitted to enter the aisle at a time, take their hand luggage and wait until the group in front of them starts moving. Passengers in different batches are only allowed to start the disembarkation when the last group of the current batch passed their seat row. Such a procedure is, for example, described in Schultz, Michael and Soolaki, Majid: "Optimized aircraft disembarkation considering COVID-19 regulations", Transportmetrica B: Transport Dynamics, 1-21 (2021).

In recent times of pandemic emergency, safety measures such as physical distancing required a staggered row-by-row disembarkation where passengers of certain seat rows are allowed to get up, crowd the aisle, gather their hand luggage and leave the aircraft. After those passengers have de-boarded, passengers of further seat rows may continue with the same procedure. The cabin crew oversees the deplaning procedure and assists the passengers with verbal cues.

Advanced solutions rely on lighting designs based on simple traffic guiding principles: different cabin illumination combinations indicate the rows which are designated to disembark next. The lighting scenarios complement the verbal cues given by the cabin crew to facilitate an orderly and rush-free departure from the aircraft.

Apart from abiding to health and safety guidelines, it may be generally desirable to encourage passengers in a more orderly fashion which may contribute to a more pleasant travel experience and decrease turn-over time substantially.

SUMMARY OF THE INVENTION

It is one of the objects of the invention to find improved solutions for controlled disembarkation of passengers on board a vehicle, in particular on board an aircraft, which allow for faster disembarkation times and less crowding on common paths such as aisles or gangways.

According to a first aspect of the invention, a passenger aircraft includes a plurality of passenger seats arranged in seat rows, and a disembarkation guidance system. The disembarkation guidance system includes a plurality of electronically operable visual indicators, each of the plurality of electronically operable visual indicators being assigned to a respective seat row. The disembarkation guidance system further includes an indicator control device coupled to each of the electronically operable visual indicators. The indicator control device is configured to individually control electronically operable visual indicators to indicate passengers in the assigned seat row whether they are permitted to disembark the passenger aircraft.

A second aspect of the invention relates to a method for controlling disembarkation of passengers on board of an aircraft. The aircraft includes a plurality of electronically operable visual indicators, each of the plurality of electronically operable visual indicators being assigned to a respective seat row of the passenger aircraft. In a first step, the method comprises controlling an indication state of a first set of a plurality of electronically operable visual indicators to indicate passengers in the assigned seat row that they are permitted to disembark the passenger aircraft. Simultaneously, the method comprises controlling an indication state of a second set of the plurality of electronically operable visual indicators to indicate passengers in the assigned seat row that they are not yet permitted to disembark the passenger aircraft. In a second step, the method comprises monitoring the flow of passengers currently disembarking the passenger aircraft. In a third step, the method comprises changing the indication state of the second set of the plurality of electronically operable visual indicators to indicate passengers in the assigned seat row that they are now permitted to disembark the passenger aircraft on the basis of the result of the monitoring.

It is a particular advantage of the invention that a more sophisticated way of guiding passengers through the deplaning procedure may be enabled. The method and system of the invention is able to aid in generating a continuous and steady stream of passengers currently disembarking without releasing passengers all at once, thereby avoiding unnecessary crowding or jamming. A direct consequence of such equalization of passenger flow is improved social distancing and lessened stress among the passengers, improving flight experience and safety of travel overall. Moreover, a more streamlined disembarkation procedure may take less time overall so that the turn-over time of passenger aircraft on ground may be advantageously decreased.

According to some embodiments of the first aspect, the electronically operable visual indicators could be installed in passenger service units associated with the respective seat rows. Additionally or alternatively, such electronically operable visual indicators may be closely located to the passenger in a dedicated unit apart from the passenger service unit (e.g., dedicated units in the sidewall or overhead stowage compartment). Moreover, such electronically operable visual indicators may be software-implemented functions that enable a display integrated in a seat or adjacent monument to fulfil the function of a visual indicator. Any of those possibilities advantageously allow for the disembarkation guidance system to be implemented as a retro-fit system for older aircraft since already existing indicators in the passenger service units, for example seatbelt signs, or newly implemented signs, may be re-purposed or additionally used for indicating to passengers when their allotted time for disembarkation has arrived.

According to some embodiments of the first aspect, the indication states of the plurality of electronically operable visual indicators include being constantly switched off, being constantly switched on and intermittently flashing with a controllable frequency. According to some embodiments of the first aspect, the method may further comprise controlling an indication state of a third set of the plurality of electronically operable visual indicators to indicate passengers in the assigned seat row that they may get ready to disembark the passenger aircraft. In some embodiments, simultaneously to changing the indication state of the second set of the plurality of electronically operable visual indicators the indication state of the third set of the plurality of electronically operable visual indicators is changed as well to indicate passengers in the assigned seat row that they are not yet permitted to disembark the passenger aircraft. Instead of binary operation of the indicators with just two indication states ("on" and "off"), different indication or different symbols/signs states may advantageously be used to signal various states of attention to the passengers, such as, for example, "remain seated", "get ready to disembark", "retrieve hand luggage", "crowd the aisle" and/or "leave the aircraft". Conveying information to the passenger in a more granular manner may improve compliance of the passengers and further reduce deplaning times.

According to some embodiments of the first aspect, monitoring the flow of passengers currently disembarking the passenger aircraft includes evaluating the output of optical surveillance devices installed in the passenger aircraft and associated with respective seat rows. According to some alternative embodiments of the first aspect, monitoring the flow of passengers currently disembarking the passenger aircraft includes monitoring of the disembarkation process by cabin crew members. This enables various deplaning strategies to be employed depending on availability of existing surveillance systems in the aircraft and/or cabin crew members.

According to some embodiments of the second aspect, the disembarkation guidance system further includes a master control device installed in the cockpit of the passenger aircraft and configured to activate or deactivate the indicator control device. This enables the cockpit crew to override the remainder of the system in order to comply with flight safety rules.

According to some embodiments of the second aspect, the electronically operable visual indicators are installed in passenger service units associated with the respective seat rows. Additionally or alternatively, such electronically operable visual indicators may be closely located to the passenger in a dedicated unit apart from the passenger service unit (e.g., dedicated units in the sidewall or overhead stowage compartment). Moreover, such electronically operable visual indicators may be software-implemented functions that enable a display integrated in a seat or adjacent monument to fulfil the function of a visual indicator. Any of those possibilities advantageously allow for the disembarkation guidance system to be implemented as a retro-fit system for older aircraft since already existing indicators in the passenger service units, for example seatbelt signs, may be re-purposed or additionally used for indicating to passengers when their allotted time for disembarkation has arrived.

According to some embodiments of the second aspect, the indicator control device is configured to send control signals to the plurality the electronically operable visual indicators to cause them to either be constantly switched off, intermittently flash with a controllable frequency or be constantly switched on. For example, the indicator control device may be configured to simultaneously cause a first set of electronically operable visual indicators to be constantly switched off, a second set of electronically operable visual indicators to be intermittently flashing, and a third set of electronically operable visual indicators to be constantly switched on. Instead of binary operation of the indicators with just two indication states ("on" and "off"), different indication states may advantageously be used to signal various states of attention to the passengers, such as, for example, "remain seated", "get ready to disembark", "retrieve hand luggage", "crowd the aisle" and/or "leave the aircraft". Conveying information to the passenger in a more granular manner may improve compliance of the passengers and further reduce deplaning times.

According to some embodiments of the second aspect, the indicator control device may be configured to maintain the control signals sent to the plurality the electronically operable visual indicators for a pre-determined timespan or to alter the control signals sent to the plurality the electronically operable visual indicators on the basis of optical surveillance devices installed in the passenger aircraft and associated with respective seat rows. A first approach for a sequential disembarkation sequence may simple be to indicate blocks of seat rows permitted to disembark in a fixed sequence of timespans. A second approach may be for cabin crew members to monitor the current disembarkation process and free up additional or subsequent blocks of seat rows for disembarkation. Finally, a third approach may be to automatically or semi-automatically survey, by a dedicated computer system, the passenger cabin using optical sensors such as video cameras and give permission to additional or subsequent blocks of seat rows to disembark based on the dynamic changes in state of crowding in the aisle. In this approach, other types of sensors, such as seat occupation sensors, may be additionally or alternatively used to monitor the current disembarkation process.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
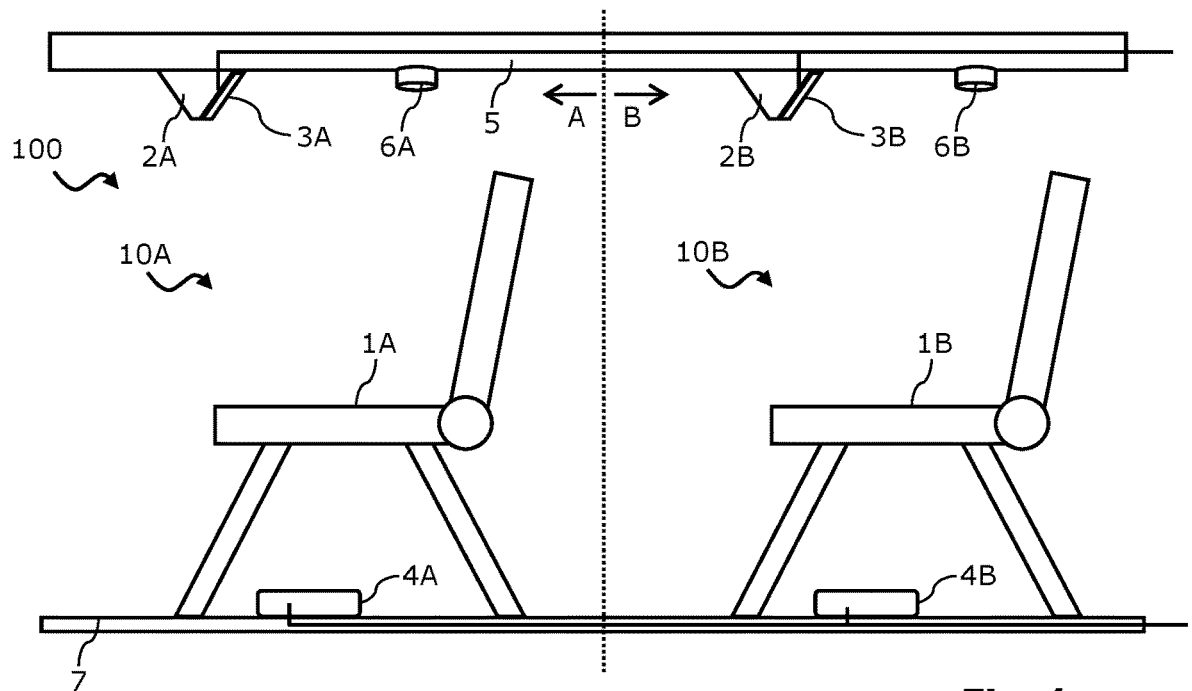
FIG. 1 schematically illustrates a side view of two seat rows in a passenger cabin of an aircraft with a disembarkation guidance system according to some embodiments of the invention.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION OF THE PREFERRED EMBODIMENTS

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

FIG. 1 shows a side view of two seat rows 10A and 10B in a passenger cabin of an aircraft. The two seat rows 10A and 10B are equipped with a disembarkation guidance system and may, for example, be implemented in a passenger aircraft such as the aircraft P schematically illustrated in FIG. 2. The disembarkation guidance system in the aircraft P may, for example, be used in a method for controlling disembarkation of passengers on board of an aircraft such as the method M as exemplarily explained and shown in conjunction with FIG. 3.

The passenger aircraft P includes a plurality of passenger seats 10A, 10B arranged in seat rows A, B. In the illustrated example, only two seat rows A and B are shown, however, more than two seat rows may be provided. In particular, the seat rows may be classified into batches of seats regarding a sequence of deplaning. To that end, the passenger aircraft P includes a disembarkation guidance system 100. The disembarkation guidance system 100 comprises a number of electronically operable visual indicators, such as, for example, electronically operable visual indicators 3A, 3B installed in a passenger service unit 2A, 2B associated with respective seat rows A and B, respectively.

Such visual indicators of the passenger service units 2A, 2B may, for example, be seatbelt signs (also called "fasten-your-seat belt" signs). It may also be possible to use other electronically operable visual indicators such as, for example, lighting elements 4A, 4B at the edges of the aisles bordering on the respective seat rows or similar lighting element. In particular, the electronically operable visual indicators may be components having an active light emitting element so that a visually perceptible indication may be controllably presented to a passenger in the associated seat row. The electronically operable visual indicators may also be newly implemented signs or software-implemented display functions of electronic displays associated with specific passenger seats.

The electronically operable visual indicators are under control of an indicator control device 20 coupled to each of the electronically operable visual indicators 3A, 3B; 4A, 4B, for example via a wireless or wired network connection. The indicator control device 20 is configured to individually control electronically operable visual indicators to alter between various indication states of the electronically operable visual indicators. Such indication states may, for example, be constantly switched off, intermittently flash with a controllable frequency or be constantly switched on. Other possibilities may be various colors, various signage, various brightness for the electronically operable visual indicators. In any case, the various indication states may signal to passengers seated in the assigned seat row whether they are permitted to disembark the passenger aircraft, whether they are next in line or whether they are not yet permitted to disembark the passenger aircraft but should keep ready.

The disembarkation guidance system 100 may further include a master control device 30 installed in the cockpit of the passenger aircraft P. The master control device 30 may be used by the cockpit crew to activate or deactivate the indicator control device 20. For example, the cockpit crew may make sure that all flight safety rules upon arriving at a parking position at an airport are complied with before giving clearance for the entire disembarkation process.

In one example, the indicator control device 20 is configured to simultaneously cause a first set of electronically operable visual indicators 3A, 3B to be constantly switched off, a second set of electronically operable visual indicators 3A, 3B to be intermittently flashing, and a third set of electronically operable visual indicators 3A, 3B to be constantly switched on. For example, at the start of the disembarkation procedure the first set of indicators is associated with the first batch of seat rows the passengers of which are to be permitted to leave the aircraft first. In a front-to-back deplaning scenario, this batch might include the first n rows, with n>0. In such a scenario, the second set of indicators are associated with a second batch of seat rows the passengers of which are to be permitted to leave the aircraft after all the passengers of the first batch have already deboarded. In a front-to-back deplaning scenario, this second batch might include the rows with numbers n to 2n, with n>0. The second set of indicators are associated with a third batch of seat rows the passengers of which are to be permitted to leave the aircraft after all the passengers of the second batch have already deboarded, i.e., the seat rows with numbers 2n to 3n, with n>0.

There are several possibilities for the indicator control device 20 to toggle batches of seat rows between sequential indication states. To that end, the control signals of the indicator control device 20 to the different electronically operable visual indicators may be adapted, depending on the chosen toggling strategy. For example, each of the indication states may be maintained for a pre-determined timespan which is based on experience or simulation of the timespan usually needed by a certain number of passengers to disembark the aircraft. Alternatively or additionally, it may be possible to alter the control signals sent to the plurality the electronically operable visual indicators 3A, 3B on the basis of optical surveillance devices 6A, 6B installed in the passenger aircraft P and associated with respective seat rows A, B. The optical surveillance devices 6A, 6B may, for example, be video camera systems which are able to gather video sequences of certain parts of the passenger cabin. The video sequences are then monitored for the presence of passengers in the seats and/or the aisles of the aircraft. Once all passengers have gone or the passenger density falls below a predetermined threshold, the indicator control device 20 may control the electronically operable visual indicators 3A, 3B to cycle the batches of seat rows to the next indication states. Instead of the optical surveillance devices—or additionally to the optical surveillance devices—other monitoring means such seat occupation sensors may be employed. The seat occupation sensors may detect whether a passenger associated with a specific passenger seat has already stood up.

Figure 2:
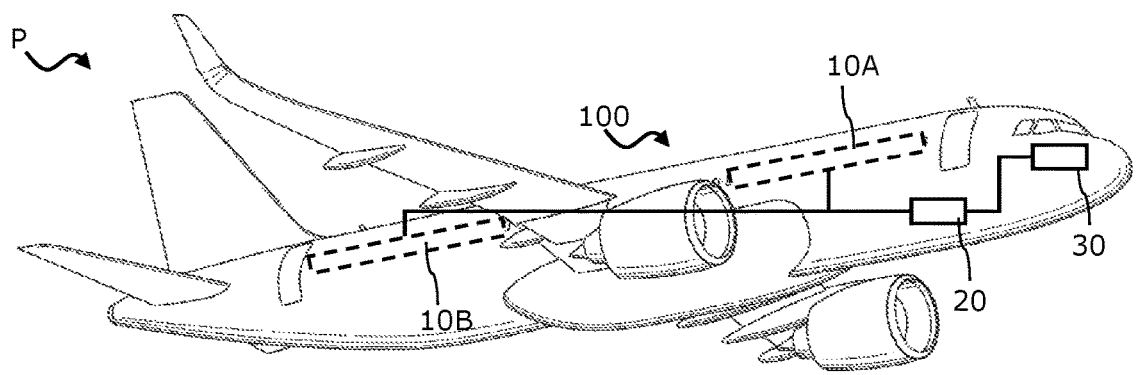
FIG. 2 schematically illustrates an aircraft with a disembarkation guidance system according to some further embodiments of the invention.
Figure 3:
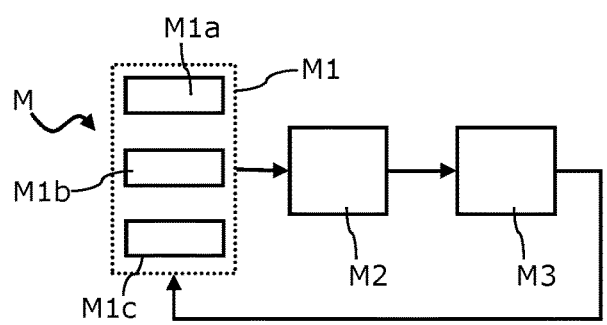
FIG. 3 schematically illustrates stages of a method for controlling disembarkation of passengers on board of an aircraft according to some further embodiments of the invention.

A method M for controlling disembarkation of passengers on board of a passenger aircraft, such as the passenger aircraft P illustrated and explained in conjunction with FIG. 2, is exemplarily depicted in FIG. 3. The method M comprises a first stage M1 in which different sets of a plurality of electronically operable visual indicators, such as the indicators 3A, 4A, 3B and 4B assigned to different seat rows A or B of the passenger aircraft, are controlled differently. The control may, for example, be exerted by the indicator control device 30. The indicator control device 30 may, for example, be integrated into a flight attendant panel or any other central entity of the cabin network that is accessible to the cabin crew of the aircraft. The electronically operable visual indicators controlled by the indicator control device 20 may, for example, be installed in passenger service units 2A, 2B associated with the respective seat rows A or B, such as, for example, seatbelt signs (so-called "fasten your seatbelt" signs) or other newly implemented signs.

A first set of electronically operable visual indicators may be controlled in substage M1a to indicate passengers in the assigned seat row (for example, seat row A) that they are permitted to disembark the passenger aircraft P. In a front-to-back deplaning scenario, the first batch of seat rows may be the seat rows located in the very front of the passenger cabin. At the same time, an indication state of a second set of electronically operable visual indicators is controlled to indicate passengers in the assigned seat row (for example, seat row B) that they are not yet permitted to disembark the passenger aircraft. In a front-to-back deplaning scenario, seat rows located behind the first batch of seat rows may be the seat rows of the second set. The indication state of the second set of indicators may, for example, be a "steady" state, indicating to passengers that they will be next in line for disembarkation once the passengers of the previous batch of seat rows have left the aircraft.

The indication states of the electronically operable visual indicators may be visually distinctive parameters such as different colors, different pictograms displayed or different brightness settings. In some variations, the electronically operable visual indicators may be controlled to be constantly switched off, be constantly switched on and intermittently flash with a controllable frequency. The controllable frequency may be set by the indicator control device 20.

In some implementations, a third set of electronically operable visual indicators may be controlled in their indication state in substage M1c to indicate passengers in the assigned seat row that they may get ready to disembark the passenger aircraft. The indication state of the third set of electronically operable visual indicators may be a "get ready" state, i.e., a precursor state to the "steady" state of the second set of electronically operable visual indicators indicating to passengers that they are not yet in line to disembark and that other passengers will be permitted to disembark before they are in line to disembark.

The indication states of the first, second and eventually third set may be simultaneously changed once certain state parameters have been reached. In particular, the sequence of indication states of the first, second and third set may be mutually exclusive so that only one batch of seat rows may be in any given indication state at the same time.

The method M comprises in a second stage M2 a step of monitoring the flow of passengers currently disembarking the passenger aircraft P. For example, the output of optical surveillance devices 6A, 6B installed in the passenger aircraft P and associated with respective seat rows may be evaluated to determine if all passengers currently permitted to disembark have actually left the aircraft. In some cases, it may be sufficient that a certain percentage of passengers currently permitted to disembark have actually left the aircraft.

It may also be possible that cabin crew members manually monitor the disembarkation process and give a manual input to the indicator control device 20 once the disembarkation process has sufficiently proceeded.

In a final stage M3 of the method M, the indication state of the second set of electronically operable visual indicators is changed to indicate passengers in the assigned seat row (for example, seat row B) that they are now permitted to disembark the passenger aircraft P on the basis of the result of the monitoring stage M2.

The systems and devices described herein may include a controller (including master control device 30 and indicator control device 20) or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method or controlling disembarkation of passengers on board of a passenger aircraft, the method comprising:
controlling an indication state of a first set of a plurality of electronically operable visual indicators, each of the plurality of electronically operable visual indicators being assigned to a respective seat row of the passenger aircraft, to indicate to passengers in a first assigned seat row that they are permitted to disembark the passenger aircraft;
controlling an indication state of a second set of the plurality of electronically operable visual indicators to indicate to passengers in a second assigned seat row that they are not yet permitted to disembark the passenger aircraft;
monitoring a flow of passengers currently disembarking the passenger aircraft by evaluating an output of one or more optical surveillance devices installed in the passenger aircraft and associated with the respective seat rows; and
changing the indication state of the second set of the plurality of electronically operable visual indicators to indicate to passengers in the second assigned seat row that they are now permitted to disembark the passenger aircraft based on a result of the monitoring.

2. The method of claim 1, wherein the first and second sets of electronically operable visual indicators are installed in passenger service units associated with the respective seat rows.

3. The method of claim 2, wherein the first and second sets of electronically operable visual indicators are at least one of seatbelt signs or are installed in proximity to or in a seat of the respective seat rows.

4. The method of claim 1, wherein the indication states of the plurality of electronically operable visual indicators include being constantly switched off, being constantly switched on and intermittently flashing with a controllable frequency.

5. The method of claim 1, further comprising:
controlling an indication state of a third set of the plurality of electronically operable visual indicators to indicate to passengers in a third assigned seat row that they may get ready to disembark the passenger aircraft.

6. The method of claim 5, wherein simultaneously to changing the indication state of the second set of the plurality of electronically operable visual indicators, the indication state of the third set of the plurality of electronically operable visual indicators is changed as well, to indicate to passengers in the third assigned seat row that they are not yet permitted to disembark the passenger aircraft.

7. The method of claim 1, wherein monitoring the flow of passengers currently disembarking the passenger aircraft includes monitoring of a process of the disembarkation by cabin crew members.

8. A passenger aircraft, comprising:
a plurality of passenger seats arranged in seat rows; and
a disembarkation guidance system including:
a plurality of electronically operable visual indicators, each of the plurality of electronically operable visual indicators being assigned to a respective seat row;
at least one optical surveillance device installed in the passenger aircraft and associated with the respective seat rows; and
an indicator control device coupled to each of the electronically operable visual indicators and configured to individually control electronically operable visual indicators to indicate to passengers in an assigned one of the seat rows whether they are permitted to disembark the passenger aircraft.

9. The passenger aircraft of claim 8, wherein the disembarkation guidance system further includes a master control device installed in a cockpit of the passenger aircraft and configured to activate or deactivate the indicator control device.

10. The passenger aircraft of claim 8, wherein the electronically operable visual indicators are installed in passenger service units associated with the respective seat rows.

11. The passenger aircraft of claim 10, wherein the electronically operable visual indicators are at least one of seatbelt signs or other specific symbols.

12. The passenger aircraft of claim 10, wherein the indicator control device is configured to send control signals to the plurality of electronically operable visual indicators to cause them to either be constantly switched off, intermittently flash with a controllable frequency or be constantly switched on.

13. The passenger aircraft of claim 12, wherein the indicator control device is configured to simultaneously cause a first set of electronically operable visual indicators to be constantly switched off, a second set of electronically operable visual indicators to be intermittently flashing, and a third set of electronically operable visual indicators to be constantly switched on.

14. The passenger aircraft of claim 12, wherein the indicator control device is configured to maintain the control signals sent to the plurality of electronically operable visual indicators for a pre-determined timespan or to alter the control signals sent to the plurality of electronically operable visual indicators based on the at least one of the optical surveillance devices or seat occupation sensors installed in the passenger aircraft and associated with respective passenger seats of the seat rows.

\* \* \* \* \*